(No Model.)
J. M. RUTHRAUFF.
KNEADING MACHINE.
No. 461,892. Patented Oct. 27, 1891.
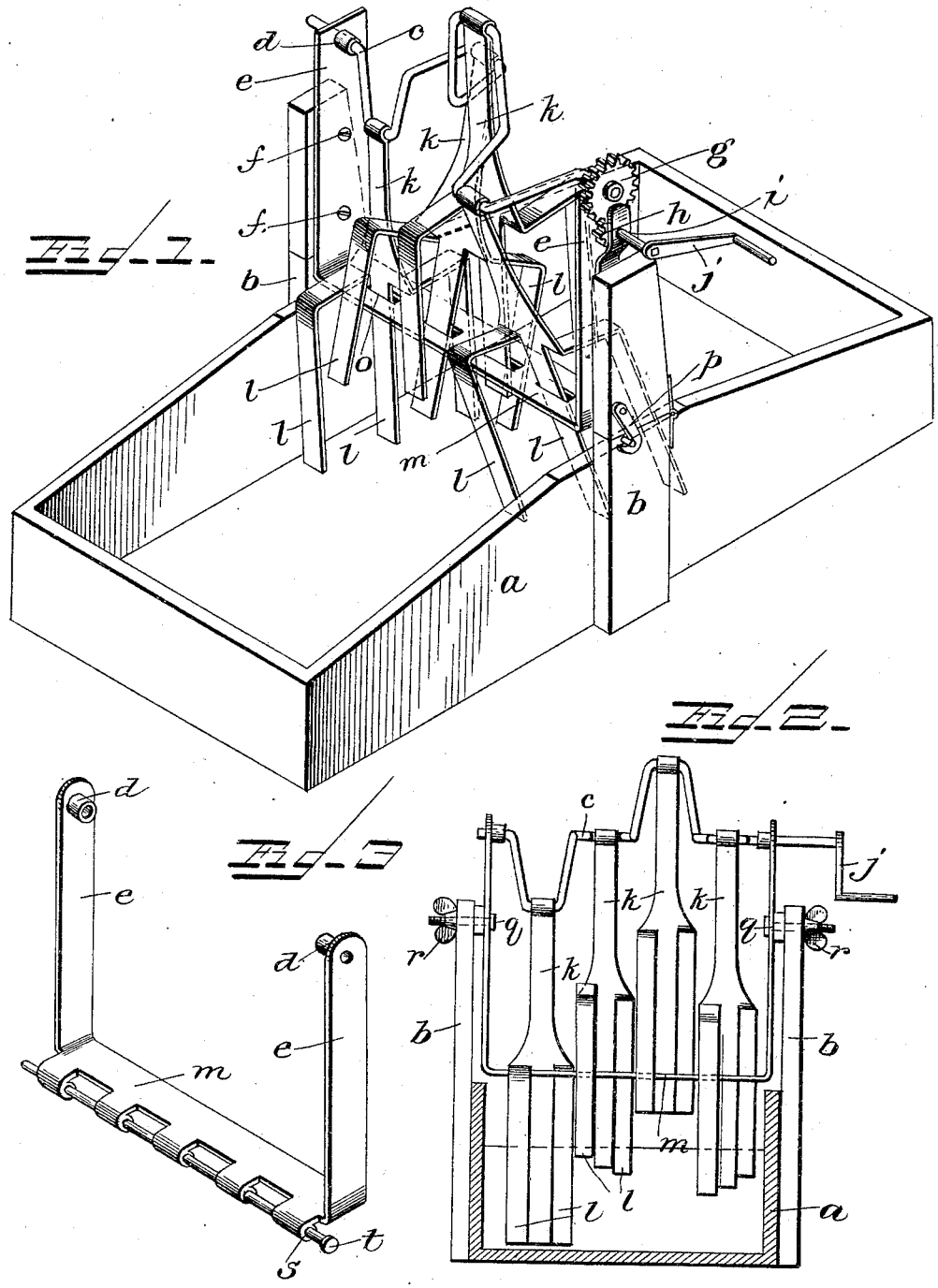
WITNESSES
F. L. Ourand
E. A. Fincel
INVENTOR
John Mosheim Ruthrauff.
by W. J. Fincel
his Attorney.

UNITED STATES PATENT OFFICE.

JOHN MOSHEIM RUTHRAUFF, OF DIXON, ILLINOIS.

KNEADING-MACHINE.

SPECIFICATION forming part of Letters Patent No. 461,892, dated October 27, 1891.

Application filed February 24, 1891. Serial No. 382,583. (No model.)

*To all whom it may concern:*

Be it known that I, JOHN MOSHEIM RUTHRAUFF, a citizen of the United States, residing at Dixon, in the county of Lee and State of Illinois, have invented a certain new and useful Improvement in Kneading-Machines, of which the following is a full, clear, and exact description.

This invention relates to machines for kneading dough.

In carrying out my invention I employ by preference a series of kneaders, no two of which are in the same position at the same time, so that there is imparted to the dough an action resembling that of the human hands. Each kneader is provided with a series of prongs or arms which lie in different planes. By means of a crank-shaft and a fixed guide I impart to the kneaders an up-and-down vibratory movement by which the dough is not only kneaded, but moved back and forth under the kneaders, so that it shall be thoroughly kneaded in every part. While I prefer to employ a plurality of kneaders, yet I may use only one.

The invention will be described first, and then I will proceed to particularly set forth and finally claim the part or improvement constituting my invention.

In the accompanying drawings, illustrating my invention, in the several figures of which like parts are similarly designated, Figure 1 is a perspective view. Fig. 2 is a sectional elevation, also illustrating a modification; and Fig. 3 is a perspective view of a modified form of guide.

The letter $a$ designates a trough of suitable construction. It may be made, as shown, rectangular and with sloping upper edges. The sides of this trough are provided with standards $b$, and these standards are supplied with suitable housings or bearings for a crank-shaft $c$, the said crank-shaft having as many cranks as there are kneaders and the said cranks being so disposed that no two of the kneaders shall occupy the same position at the same time. In the illustrations of my invention shown in the drawings I make the bearings $d$ for the crank-shaft in uprights $e$, which are made fast, as by screws $f$, to the standards $b$. As shown in Fig. 1, the crank-shaft may be supplied with a toothed wheel $g$, which is engaged by a toothed pinion $h$, and the said toothed pinion $h$ is provided with a shaft $i$, to which is applied the power handle or crank $j$.

As the several kneaders are the same in construction, I will describe one and this description will answer for all.

$k$ is a shank connected in any suitable manner with the crank-shaft $c$. This shank is supplied with three (more or less) parallel arms or prongs $l$, lying in different planes, but preferably of the same length. One of these prongs may be in alignment with the shank $k$, and the others may be disposed on opposite sides of this center prong or arm. The ends of the prongs or arms may be enlarged, if need be, or provided with knobs to get a proper surface to act upon the dough. A transverse bar $m$ is arranged between the uprights $e$, and indeed may be a continuation of such uprights when they are made of metal. This bar $m$ is arranged horizontally and is provided with openings $o$, corresponding in number with the number of kneaders employed. The central prong or arm of the kneader projects through the opening $o$. The crank-shaft gives to the kneader an up-and-down motion, while the bar $m$ gives to it a vibratory or rocking motion. The up-and-down motion might be called a "kneading motion," while the vibratory or rocking motion not only assists in the kneading, but also serves to move the dough back and forth in accordance with the direction of rotation of the shaft.

As shown in Fig. 1, the upper portions of the standards $b$ are hinged to the lower portions and united by hooks or other devices $p$, so that when said hooks are released the upper portions of these standards may be turned down upon the trough or tray, and the kneaders thereby turned up out of said trough or tray to permit the manipulation of the dough by hand for removal or other purpose and for cleaning the tray.

Instead of dividing the standards as just described, and instead of fastening the uprights $e$ rigidly to said standards, I may make the standards solid and attach the uprights to them pivotally, as shown in Fig. 2.

$q\ q$ are the pivots, which may be made as screw-bolts, and $r\ r$ are winged nuts applied to said bolts to clamp the uprights to the standards to hold the parts in working position and to permit of the bolts being released, so that the uprights and their connected kneaders may be turned up out of the trough or tray, as described, of the device in Fig. 1. This form of uprights, whether constructed with a transverse bar such as shown in Fig. 1 or in Fig. 3, as hereinafter described, is the one I prefer, and for the reason that it enables me to adapt the machine to a large or small batch of dough and to work it in any desired portion of the trough by clamping the kneaders in the desired position. It also enables me to hold the kneaders when turned out of the trough for cleaning and other purposes.

Instead of making the bar $m$ with slots $o$, I may notch one side of said bar, as shown in Fig. 3, and form a tube $s$ on the edge to receive a pin $t$, which pin serves to lock the kneaders in the bar and also affords a means for the ready disconnection of any one or more of the kneaders, when that is desirable, for cleaning or other purposes.

As shown in Fig. 2, the machine may be used equally well without gearing, the crank $j$ being applied directly to the crank-shaft.

As already indicated, the machine may be made with one or with a number of the kneaders constructed in accordance with this invention.

What I claim is—

1. In a kneading-machine, a trough, standards applied thereto, uprights having a transverse bar adapted to receive the kneaders, and clamping-pivots to secure the uprights to the standards pivotally and adjustably relatively to the trough, combined with a crank-shaft having bearings in said uprights, and kneaders applied to said crank-shaft and to the transverse bar and adapted to be turned up out of the trough and into various relations to the trough in accordance with the work to be done and to be held in such adjusted positions by the clamping-pivots, substantially as described.

2. A kneading-machine having a crank-shaft provided with a plurality of cranks arranged thereon in different planes or at different projections, a corresponding number of kneaders applied to such cranks and each kneader having a central arm and an arm on each side and out of alignment with the central arm, and a bar provided with as many openings as there are kneaders to receive the central arms of the kneaders, substantially as described.

In testimony whereof I have hereunto set my hand this 20th day of February, A. D. 1891.

JOHN MOSHEIM RUTHRAUFF.

Witnesses:
H. R. BARTLETT,
OSCAR G. SMITH.